US012707449B2

(12) United States Patent
Sarma Munukutla et al.

(10) Patent No.: US 12,707,449 B2
(45) Date of Patent: Aug. 11, 2026

(54) TECHNIQUES FOR CO-EXISTENCE OPERATION WITH INCREASED IN-BAND ISOLATION

(71) Applicant: Cypress Semiconductor Corporation, San Jose, CA (US)

(72) Inventors: Sandeep Sarma Munukutla, Bangalore (IN); Suprojit Mukherjee, Nadia (IN); Raghavendra Kencharla, Bangalore (IN); Ayush Sood, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 319 days.

(21) Appl. No.: 18/630,855

(22) Filed: Apr. 9, 2024

(65) Prior Publication Data

US 2025/0317923 A1 Oct. 9, 2025

(51) Int. Cl.
*H04W 72/12* (2023.01)

(52) U.S. Cl.
CPC ................................ *H04W 72/1215* (2013.01)

(58) Field of Classification Search
CPC ............. H04W 72/1215; H04W 72/04; H04W 72/044; H04W 72/0446; H04W 28/00
See application file for complete search history.

(56) References Cited

U.S. PATENT DOCUMENTS

| | | | | |
|---|---|---|---|---|
| 2012/0252442 A1* | 10/2012 | Fu | H04W 24/10 | 455/426.1 |
| 2015/0223243 A1* | 8/2015 | Tabet | H04L 5/0073 | 370/330 |
| 2015/0296523 A1* | 10/2015 | Joshi | H04W 72/541 | 455/553.1 |
| 2019/0349957 A1* | 11/2019 | Sorrentino | H04L 67/51 | |
| 2023/0209584 A1* | 6/2023 | Rahman | H04W 72/1215 | 455/452.1 |
| 2024/0430880 A1* | 12/2024 | Verma | H04W 72/12 | |
| 2025/0031201 A1* | 1/2025 | Dutta | H04W 76/14 | |

* cited by examiner

*Primary Examiner* — Christopher M Brandt

(57) ABSTRACT

First and second wireless communication device configured to operate in a time-division multiplexing (TDM) co-existence mode using first and second channels, respectively, of a first pair of channels in a frequency band are identified. A processing device determines an in-band isolation between the first pair of channels in the frequency band is insufficient to support operation of the first and second wireless communication devices in a parallel co-existence mode. The processing device determines an in-band isolation between a second pair of channels in the frequency band is sufficient to support operation of the first and second wireless communication devices in the parallel co-existence mode. The first wireless communication device is operated in the parallel co-existence mode using a first channel of the second pair of channels with the second wireless communication device configured to operate in the parallel co-existence mode using a second channel in the second pair of channels.

20 Claims, 7 Drawing Sheets

TECHNIQUES FOR CO-EXISTENCE OPERATION WITH INCREASED IN-BAND ISOLATION

TECHNICAL FIELD

The present disclosure relates generally to the field of wireless communications, and more particularly, to techniques for co-existence operation with increased in-band isolation.

BACKGROUND

Wireless devices use a variety of different wireless technologies to access wireless networks. This creates situations where multiple wireless technologies coexist in the same frequency band. For example, there may be a coexistence of a wireless local-area network (WLAN) and a wireless personal area network (WPAN). The coexistence of multiple wireless technologies in the same frequency band increases the radio frequency (RF) interference within the frequency band, making it more difficult for wireless devices to communicate.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
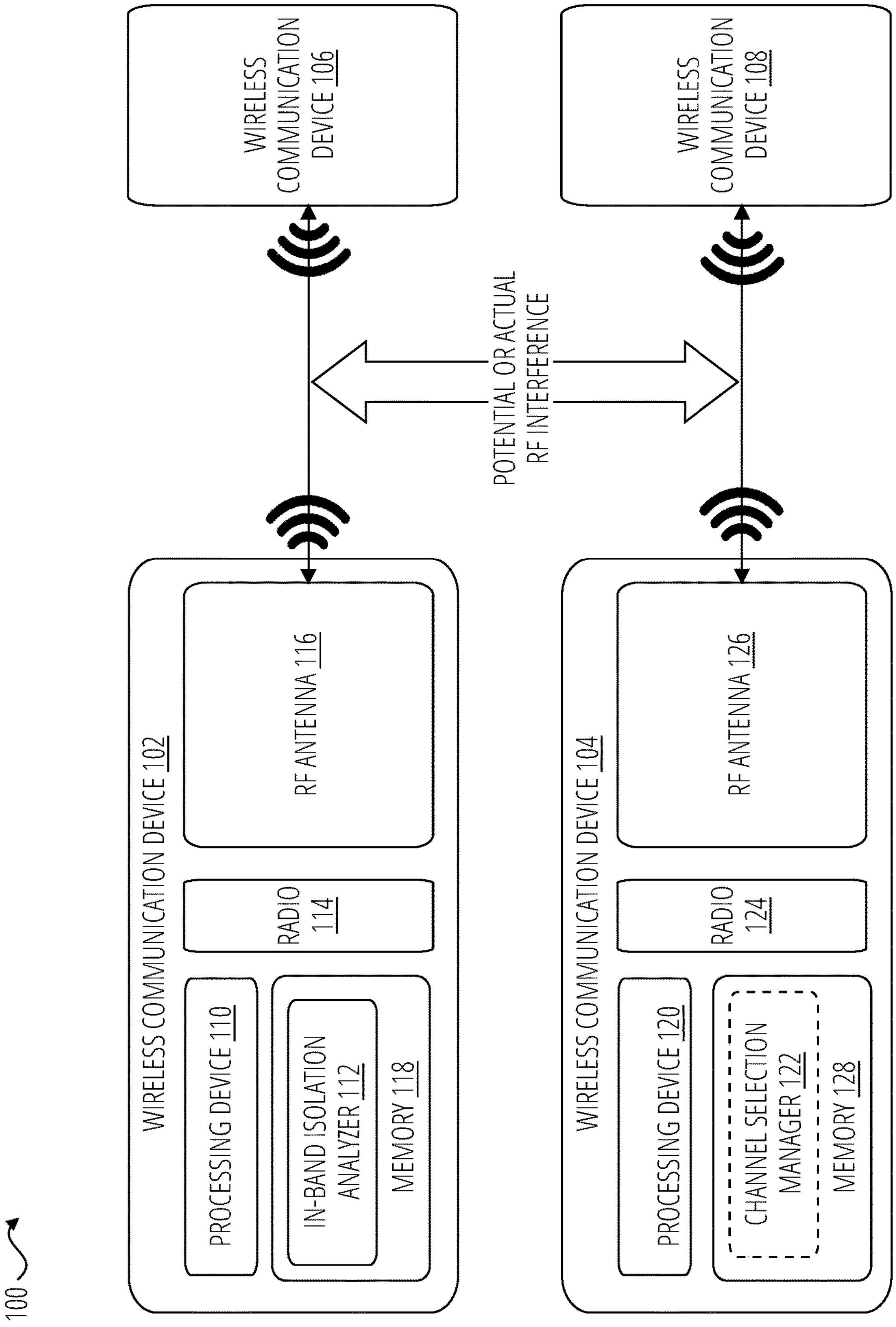
FIG. 1 illustrates an exemplary operating environment for increasing in-band isolation for wireless communication devices in co-existence modes of operation according to some embodiments.

The following description sets forth numerous specific details such as examples of specific systems, components, methods, and so forth, in order to provide a good understanding of various embodiments of the techniques described herein for increasing in-band isolation for wireless communication devices in co-existence modes of operation. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Different wireless communication devices may utilize the same frequency band for communication. For example, a WLAN communication device and a WPAN communication device may utilize the 2.4 gigahertz (GHz) frequency band for communication. Each frequency band may include a number of different sub-bands, referred to as channels, that may be utilized by the wireless communication devices. For example, the 2.4 GHz frequency band utilized by WLAN communication devices may include up to 14 channels and the 2.4 GHz frequency band utilized by WPAN communication devices may include up to 16 channels. However, when channels utilized by different wireless communication devices are too close within the frequency band, RF interference can have a detrimental effect on wireless communications. Wireless coexistence techniques are aimed at facilitating the ability of multiple wireless communication devices to access the same frequency band (e.g., RF spectrum band) simultaneously without causing harmful interference to each other.

Because of the numerous types and operational parameters of wireless communication devices as well as the complex and unpredictable interactions between various wireless communication devices, it can be challenging to reliably enable different wireless communication devices to utilize the same frequency band without experiencing significant interference. Adding further complexity, different wireless communication devices may communicate based on different technical standards. For example, WPAN communication devices may utilize the 802.15.4 or 802.15.1 technical standard and WLAN communication devices may utilize the 802.11 technical standard.

These challenges and complexities result in existing solutions failing to reliably enable different wireless communication devices to utilize the same frequency band without experiencing significant interference in a variety of situations. Some existing solutions utilize time division multiplexing (TDM) with low passive isolation. However, this does not work in multiple scenarios, such as when a wireless communication device is configured in a "receive ON always" mode to accommodate aperiodic transmissions. For example, an existing solution for coexistence between WLAN and WPAN devices that utilizes TDM with low passive isolation requires the WPAN device request access to the medium before transmitting. When the WLAN device decides to honor the request it issues a clear to send to self (CTS-to-self) with a duration field updated with imminent WPAN radio activity. However, when the WPAN device is configured in "receive ON always" mode, there is no opportunity for the WLAN device to issue the CTS-to-self. This can lead to the WLAN device attempting and reattempting a transmission, which eventually leads to a degraded modulation and coding scheme (MCS) index that brings the WLAN device performance down. Additionally, the WLAN device transmissions can interfere with the WPAN device transmissions. Further, low passive isolation prevents the use of a parallel mode of operation in which different wireless communication devices can simultaneously transmit and receive. These limitations can drastically reduce the usability of different wireless communication devices utilizing the same frequency band, contributing to excessive interference and inefficient systems, devices, and techniques with limited capabilities.

Embodiments of the present disclosure address the above and other problems by enabling wireless communication devices to dynamically switch to a parallel mode from TDM by increasing the in-band isolation between different wireless communication devices (e.g., WLAN and WPAN communication devices. Accordingly, wireless communication devices may be caused to operate on channels with an increased-band isolation, thereby enabling operation in parallel mode without interfering with one another to an extent that degrade performance. For example, a WLAN device and/or a WPAN device utilizing the same frequency band can be forced to utilize extreme channels in the frequency band (e.g., near the extents of the band) to provide sufficient in-band isolation to support parallel mode operation. In some such examples, the WLAN device may initially assess the possible extreme channels in which the PAN device and/or WLAN device can be forced to use. The in-band leakage between the possible extreme channels may then be estimated and utilized to decide whether conditions allow operation in parallel mode.

In an illustrative embodiment, a WLAN communication device may be configured to operate in a TDM co-existence mode using a frequency band and a WPAN communication device may be configured to operate in the TDM co-existence mode using the frequency band (e.g., 2.4 GHZ). A processing device of the WLAN communication device may determine an in-band isolation between a channel utilized by the WLAN communication device (e.g., WLAN channel 6 of the 2.4 GHz frequency band) and a channel utilized by the WPAN communication device (e.g., WPAN channel 21 of the 2.4 GHz frequency band) is insufficient to support operation of the WLAN and WPAN communication devices in a parallel co-existence mode. The processing device of the WLAN communication device may determine that an in-band isolation between an available channel for the WLAN communication device (e.g., WLAN channel 1 of the 2.4 GHz frequency band) and an available channel for the WPAN communication device (e.g., WPAN channel 26 of the 2.4 GHz frequency band) is sufficient to support operation of the WLAN and WPAN communication devices in the parallel co-existence mode. The WLAN communication device may be caused to operate in the parallel co-existence mode using the available channel (e.g., WLAN channel 1 of the 2.4 GHz frequency band) and the WPAN communication device may be caused to operate in the parallel co-existence mode using the available channel (e.g., WPAN channel 26 of the 2.4 GHz frequency band) to reduce potential or actual RF interference between the WLAN and WPAN communication devices.

In these and other ways, components/techniques described hereby may provide many technical advantages. For example, embodiments may reduce RF interference by increasing in-band isolation. In another example, increased in-band isolation may be utilized to support parallel modes of operation when unavailable using existing solutions. In yet another example, dynamic switching between parallel mode and TDM modes of operation may be enabled. Thus, the computer-based techniques of the current disclosure improve wireless communications as compared to conventional approaches. Further, embodiments disclosed hereby can be practically utilized to improve the functioning of a computer and/or to improve a variety of technical fields including wireless communication, RF interference, parallel operation, and wireless co-existence techniques.

It will be appreciated that various aspects of telecommunication networks, capabilities, protocols, formats, and procedures relevant to the techniques described and terms referenced herein may be found in one or more IEEE standards, such as the 802.11 and 802.15.4 technical standards. For example, WPAN devices referenced herein may operate based, at least in part, on the 802.15.4 technical standard and WLAN devices referenced herein may operate based, at least in part, on the 802.11 technical standard.

The illustrative examples and embodiments provided above are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 illustrates an operating environment 100 for increasing in-band isolation for wireless communication devices in co-existence modes of operation according to some embodiments. The illustrated embodiment includes a first wireless communication device 102, a second wireless communication device 104, a third wireless communication device 106, and a fourth wireless communication device 108. In various embodiments, communication between the wireless communication device 102 and wireless communication device 106 may interfere with communications between wireless communication device 104 and wireless communication device 108 or vice versa due to using channels in the same frequency band that have insufficient in-band isolation. Accordingly, various embodiments described hereby may force wireless communication devices 102, 106 and wireless communication devices 104, 108 to switch to channels with sufficient in-band isolation to support a parallel mode of operation. One or more components of FIG. 1 may be the same or similar to one or more other components disclosed hereby. Further, aspects discussed with respect to various components in FIG. 1 may be implemented by one or more other components from one or more other embodiments without departing from the scope of this disclosure. For example, in-band isolation analyzer 112, or one or more functional aspects thereof, may be included in a different processing device, such as a processing device included in wireless communication device 106, without departing from the scope of this disclosure. Embodiments are not limited in this context.

The wireless communication device 102 includes a processing device 110. In some embodiments, the wireless communication device 102 may include a WLAN device including a Wi-Fi device. The memory 118 is coupled to the processing device 110 for storing instructions (including temporary data) that are executed by the processing device 110. In the illustrated embodiment, the memory 118 includes instructions for an in-band isolation analyzer 112. The wireless communication device 102 includes a radio 114. For example, the wireless communication device 102 may include a WLAN radio that is configured to communicate (e.g., transmit and/or receive) in a frequency band (e.g., the 2.4 GHz frequency band). The wireless communication device 102 includes an RF antenna 116 that is tuned to the frequency band (e.g., the 2.4 GHz frequency band).

The wireless communication device 104 includes a processing device 120. In some embodiments, wireless communication device 104 may include a WPAN device including a Zigbee and/or Bluetooth device. The memory 128 is coupled to the processing device 120 for storing instructions (including temporary data) that are executed by the processing device 120. As discussed in more detail below, the memory 128 may include instructions for a channel selection manager 122. The wireless communication device 104 includes a radio 124. For example, the wireless communication device 104 may include a WPAN radio that is configured to communicate (e.g., transmit and/or receive) in a frequency band (e.g., the 2.4 GHz frequency band). The wireless communication device 104 includes an RF antenna 126 that is tuned to the frequency band (e.g., the 2.4 GHz frequency band).

As will be discussed in more detail below, the in-band isolation analyzer 112 of wireless communication device 102 may operate to determine whether switching channels can be utilized to support parallel operation. For example, in-band isolation analyzer 112 may determine whether channels are available to use that provide sufficient in-band isolation to allow parallel operation without significant interference. For example, at a fixed WLAN received signal strength indication (RSSI), a WLAN radio may typically be able to sustain 20 dB more interference power if the separation between interfering signal frequency (e.g., WPAN frequency) and the WLAN frequency is more than 50 MHz as opposed to only 25 MHz. In various embodiments, the in-band isolation analyzer 112 may include a packet traffic arbiter (PTA).

Depending on the types of wireless communication device 102 and wireless communication device 104, one or both may be caused to switch channels in order to provide sufficient in-band isolation. For example, the wireless communication device 102 may include a WPAN device that is either an end device/client or a coordinator/router and the wireless communication device 104 may include a WLAN device that is either an access point (e.g., a software enabled access point (SoftAP)) or a client/station (STA). In such examples, WPAN devices that are a coordinator/router and WLAN devices that are an access point may be able to be caused to switch channels; however, WPAN devices that are end devices/clients and WLAN devices that are clients/STAs may not be able to be caused to switch channels.

Accordingly, when the wireless communication device 104 is a WPAN device that is a coordinator/router it may include channel selection manager 122. The channel selection manager 122 may determine a list of available channels that the wireless communication device 104 may switch to and provide the list to the channel selection manager 122 of wireless communication device 102. However, in other embodiments, such as when wireless communication device 104 includes an end device or client, the channel selection manager 122 may not be included.

It should be noted that although a single processing device is depicted in wireless communication device 102 and wireless communication device 104 for simplicity, other embodiments may include multiple processing devices, storage devices, or devices. The processing devices 110, 120 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing devices 110, 120 may also include one or more special-purpose processing devices such as an application specific integrated circuit (ASIC), a field programmable gate array (FPGA), a digital signal processor (DSP), network processor, or the like.

Figure 2:
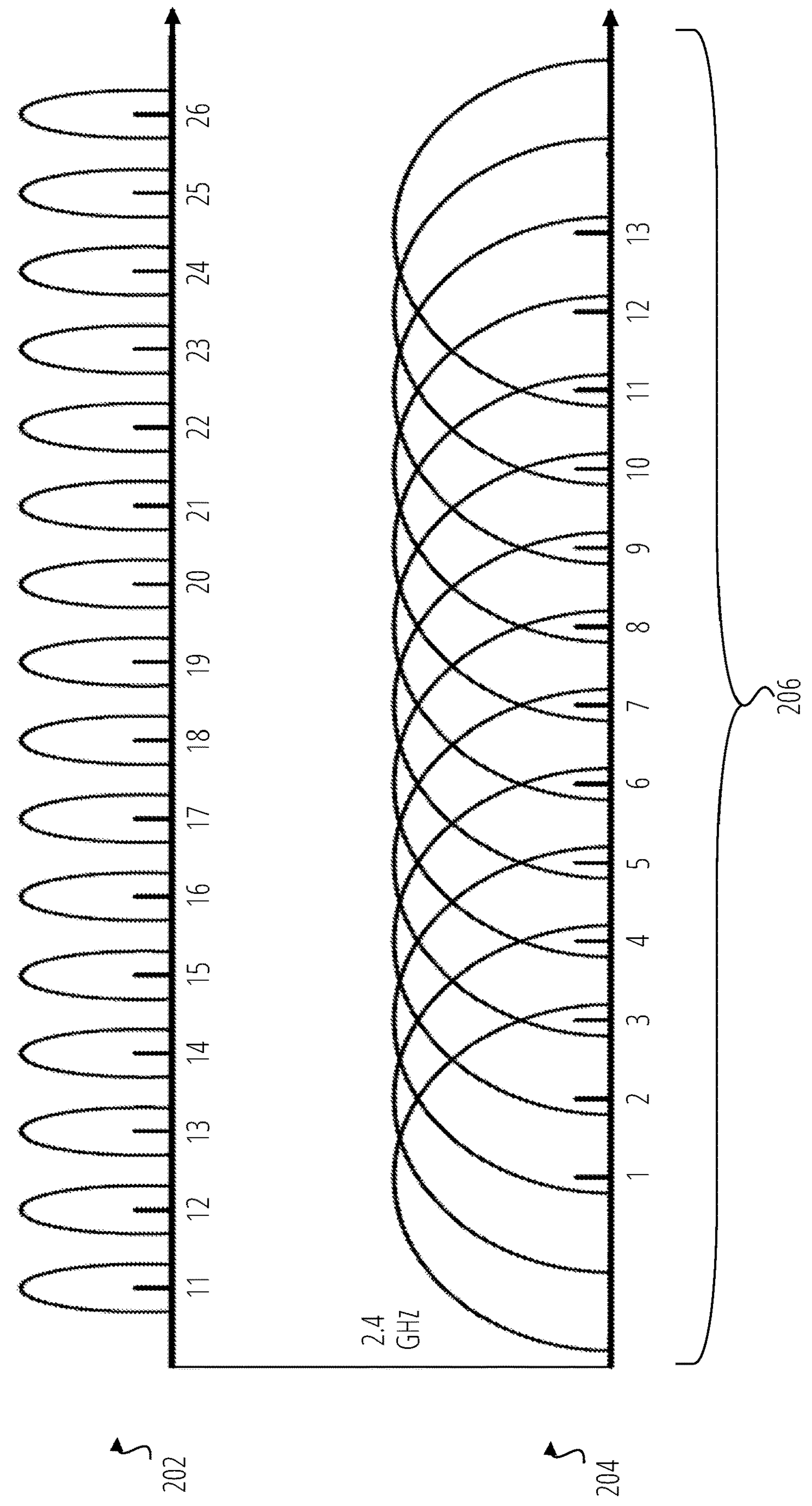
FIG. 2 illustrates exemplary WLAN and WPAN channels in a frequency band according to some embodiments.

FIG. 2 illustrates exemplary WPAN channels 202 and WLAN channels 204 in a frequency band 206 according to some embodiments. As shown in the illustrated embodiment, the frequency band 206 may include a 2.4 GHz frequency band, the WPAN channels 202 may include channels 11 through 26, and the WLAN channels 204 may include channels 1 through 13. In many embodiments, the 2.4 GHz frequency band may extend approximately between 2.4 and 2.5 GHz. In various embodiments, WPAN devices may be caused to switch to extreme channels of the frequency band 206 (e.g., channels 11, 12, 25, or 26) and/or WLAN devices may be caused to switch to extreme channels of the frequency band 206 (e.g., channels 1, 2, 12, or 13) to provide sufficient in-band isolation to support parallel operations of the WPAN and WLAN devices. For example, wireless communication device 102 may be switched from channel 7 of the WLAN channels 204 to channel 11 and wireless communication device 104 may be switched from channel 17 of the WPAN channels 202 to channel 12 to provide sufficient in-band isolation for switching to parallel operations. Embodiments are not limited in this context. For example, other frequency bands and/or channels may be utilized without departing from the scope of this disclosure.

Figure 3A:
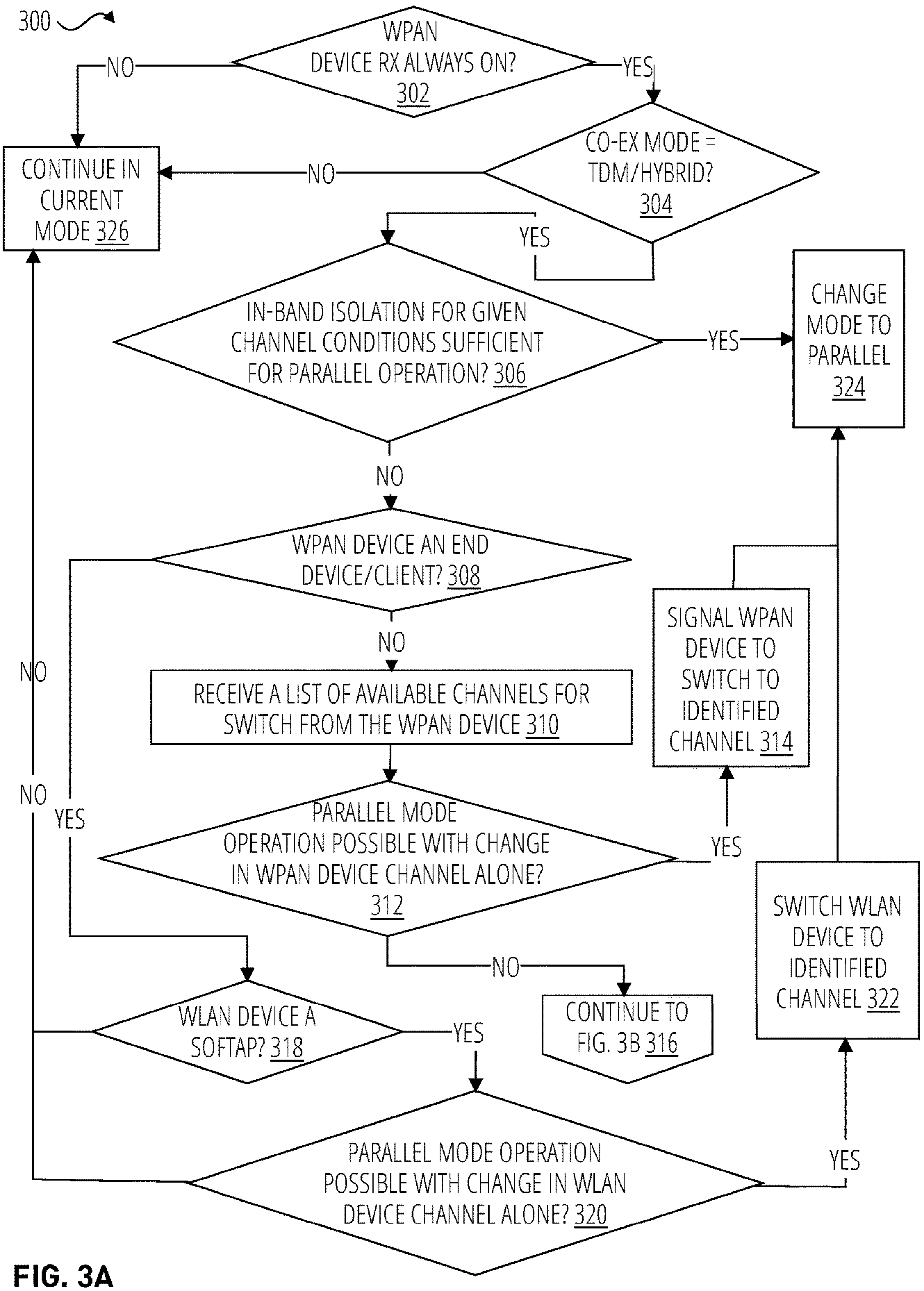
FIGS. 3A and 3B illustrate an exemplary process flow for increasing in-band isolation between WLAN and WPAN communication devices according to some embodiments.
Figure 3B:
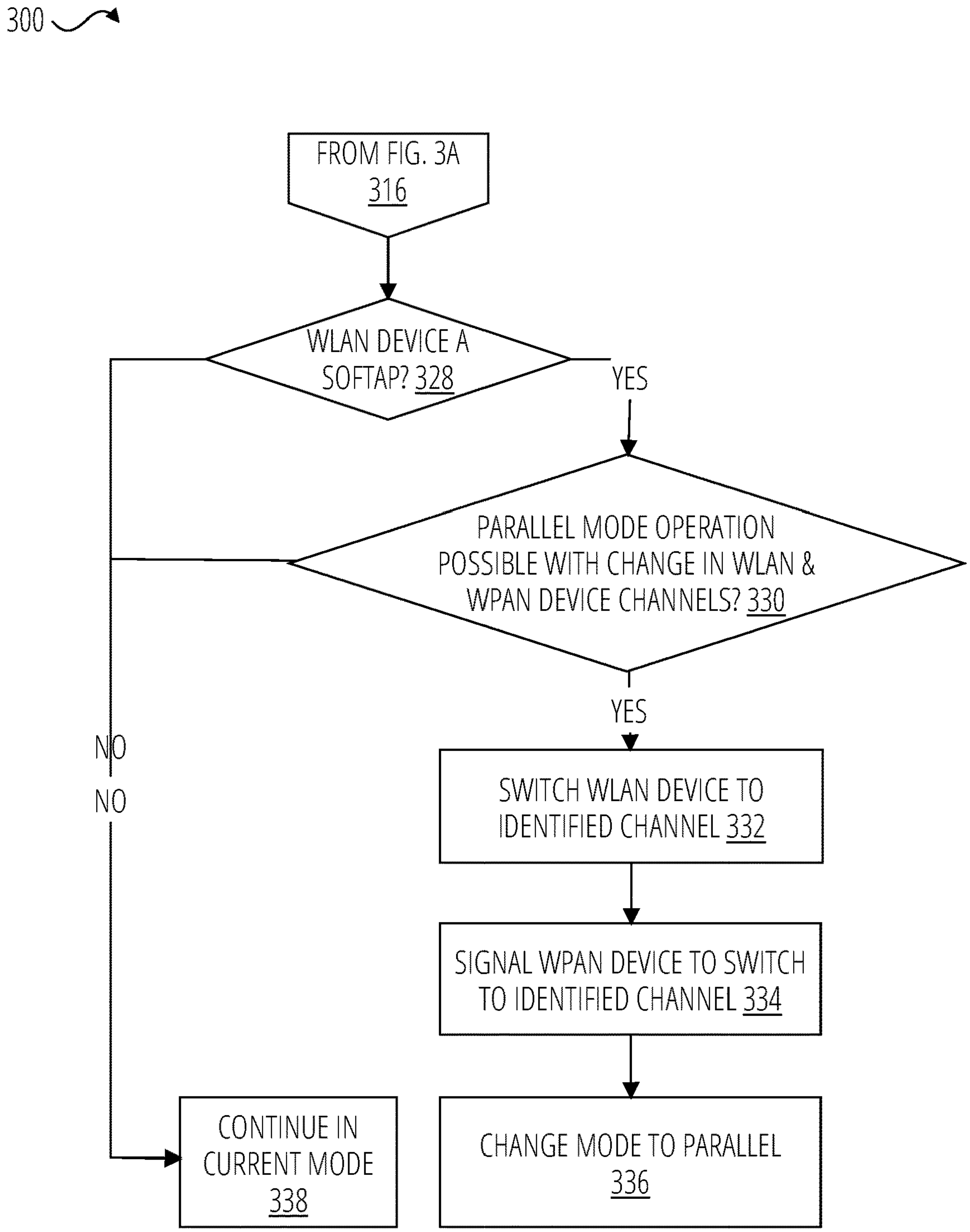

FIGS. 3A and 3B illustrate a process flow 300 for increasing in-band isolation between WLAN and WPAN communication devices according to some embodiments. The process flow 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of process flow 300 may be performed by one or more components of wireless communication device 102 or wireless communication device 106, such as in-band isolation analyzer 112 and/or processing device 110. Embodiments are not limited in this context.

With reference to FIGS. 3A and 3B, process flow 300 illustrates example functions used by various embodiments. Although specific function blocks ("blocks") are disclosed in process flow 300, such blocks are examples. That is, embodiments are well suited to performing various other blocks or variations of the blocks recited in process flow 300. It is appreciated that the blocks in process flow 300 may be performed in an order different than presented, and that not all of the blocks in process flow 300 may be performed.

Process flow 300 begins at decision block 302 in FIG. 3A, where the processing logic determines whether a WPAN device is in a "receive ON always" mode. For example, the in-band isolation analyzer 112 may determine whether wireless communication device 104 is in a "receive ON always" mode. If the WPAN device is not in a "receive ON always" mode, the process flow 300 may proceed to block 326 where operation is continued in the current mode. If the WPAN device is in a "receive ON always" mode, the process flow 300 may proceed to decision block 304. At decision block 304 it may be determined whether the co-existence mode is TDM or hybrid. If the co-existence mode is not TDM or hybrid, the process flow 300 may proceed to block 326 wherein operation is continued in the current mode. If the co-existence mode is TDM or hybrid, the process flow 300 may proceed to decision block 306.

At decision block 306 it may be determined whether the in-band isolation for given channel conditions are sufficient for parallel operation. For example, in-band isolation analyzer 112 may determine whether the in-band isolation for given channel conditions of wireless communication device 102 and wireless communication device 104 are sufficient for parallel operation. If the in-band isolation is sufficient for parallel operation, the process flow 300 may proceed to block 324 where operation is changed to the parallel mode. If the in-band isolation is not sufficient for parallel operation, the process flow 300 may proceed to decision block 308.

In various embodiments, determining whether in-band isolation is sufficient for operation in a parallel co-existence mode may occur as follows. The transmit power, P, of the WPAN device, the isolation, I, between the WLAN and WPAN antennas, and the WLAN RSSI, R, may be determined. A parameter, T, may be determined as:

$$T=P-I-R.$$

A mapping between T and the modulation index, R1, may be utilized to determine R1 based on T. A mapping between R and modulation index, R2, may be utilized to determine R2 based on R (the WLAN RSSI). If R1 is greater than R2, then there is sufficient in-band isolation and the parallel mode of operation may be selected. However, if R1 is less than R2, then there is not sufficient in-band isolation and the TDM mode of operation may be selected. Exemplary mapping tables between T and R1 and between R and R2 are provided below in Table 1 and Table 2, respectively.

TABLE 1

| T(db) | R1 |
|---|---|
| 54 | 0 |
| 51 | 1 |
| 49 | 2 |
| 46 | 3 |
| 42 | 4 |
| 38 | 5 |
| 37 | 6 |
| 36 | 7 |

TABLE 2

| R(dbm) | R2 |
|---|---|
| <−79 | 0 |
| >−79 & <−77 | 1 |
| >−77 & <−74 | 2 |
| >−74 & <−70 | 3 |
| >−70 & <−66 | 4 |
| −66 | 5 |
| −65 | 6 |
| >−64 | 7 |

Returning to process flow 300, at decision block 308 it may be determined whether the WPAN device is an end device or client. For example, it may be determined whether wireless communication device 104 is an end device or client. If the WPAN device is an end device or client, the process flow 300 may proceed to decision block 318. At decision block 318 it may be determined whether the WLAN device is a SoftAP. For example, in-band isolation analyzer 112 may determine whether wireless communication device 102 is a SoftAP. In various embodiments, when a WLAN device is a SoftAP, its basic service set (BSS) can be forced to operate in the extreme channels to provide additional in-band isolation. If the WLAN device is not a SoftAP, the process flow 300 may proceed to block 326 where operation is continued in the current mode. If the WLAN device is a SoftAP, the process flow 300 may proceed to decision block 320.

At decision block 320 it may be determined whether parallel mode operation is possible with a change in the WLAN device channel alone. For example, if the WPAN device is utilizing channel 15 of WPAN channels 202, it may be determined if any of WLAN channels 204 that are available for the WLAN to switch to will provide sufficient in-band isolation for parallel mode operation. If parallel mode operation is not possible with a change in the WLAN device channel alone, the process flow 300 may proceed to block 326 where operation is continued in the current mode. If parallel operation is possible with a change in the WLAN device channel alone, the process flow 300 may proceed to block 322 where the WLAN device is switched to the identified channel that provides sufficient in-band isolation for parallel mode operation. The process flow 300 may then continue to block 324 where operation is changed to the parallel mode.

Referring back to decision block 308, if it is determined that the WPAN device is not an end device or client, the process flow may proceed to block 310. At block 310 the WLAN device may receive a list of available channels for switching from the WLAN device. For example, wireless communication device 102 may receive a list of available channels to which wireless communication device 104 can switch. In many embodiments, the list of available channels to which wireless communication device 104 can switch may be determined by channel selection manager 122. The process flow 300 may then proceed to decision block 312 where it is determined whether parallel mode operation is possible with change in WPAN device channel alone. For example, if the WLAN device is utilizing channel 4 of WLAN channels 204, it may be determined if any of WPAN channels 202 included in the list of available channels for switching will provide sufficient in-band isolation for parallel mode operation. If parallel operation is possible with a change in the WPAN device channel alone, the process flow 300 may proceed to block 314 where the WPAN device is switched to the identified channel that provides sufficient in-band isolation for parallel mode operation. The process flow 300 may then continue to block 324 where operation is changed to the parallel mode.

Referring back to decision block 312, if parallel mode operation is not possible with a change in the WPAN device channel alone, the process flow 300 may proceed to block 316 which continues to decision block 328 in FIG. 3B. At decision block 328 it may be determined whether the WLAN device is a SoftAP. For example, in-band isolation analyzer 112 may determine whether wireless communication device 102 is a SoftAP. If the WLAN device is not a SoftAP, the process flow 300 may proceed to block 338 where operation is continued in the current mode. If the WLAN device is a SoftAP, the process flow 300 may proceed to decision block 330. At decision block 330 it may be determined whether parallel mode operation is possible with a change in WLAN and WPAN device channels. For example, it may be determined that if wireless communication device 102 switches from channel 6 of the WLAN channels 204 to channel 2 and wireless communication device 104 switches from channel 19 of the WPAN channels 202 to channel 23 there will be sufficient in-band isolation for switching to parallel operations.

If parallel mode operation is not possible with a change in WLAN and WPAN device channels, the process flow 300 may proceed to block 338 where operation is continued in the current mode. If parallel mode operation is possible with a change in WLAN and WPAN device channels, the process flow 300 may proceed to block 332. At block 332 the WLAN device may be switched to the identified channel. For example, wireless communication device 102 may be switched from channel 6 of the WLAN channels 204 to channel 2. The process flow 300 may then proceed to block

334 wherein the WPAN device may be switched to the identified channel. For example, wireless communication device 104 may be switched from channel 19 of the WPAN channels 202 to channel 23. The process flow 300 may then proceed to block 336 where operation is changed to the parallel mode.

It will be appreciated that one or more portions of process flow 300 may be repeated, such as periodically or based on a trigger, such as a change in channel conditions. In many embodiments, repeating one or more portions of process flow 300 may be utilized as a mechanism to dynamically switch WLAN and WPAN devices between different modes of operation, such as parallel and TDM modes.

Figure 4A:
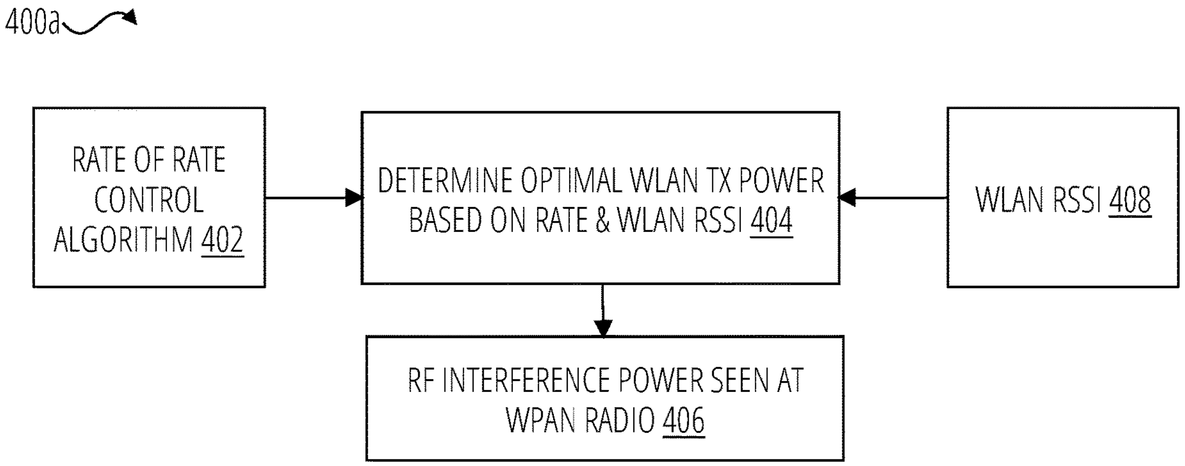
FIG. 4A illustrates an exemplary process flow for determining RF interference power seen at a WPAN radio according to some embodiments.

FIG. 4A illustrates a process flow 400*a* for determining RF interference power seen at a WPAN radio according to some embodiments. The process flow 400*a* may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of process flow 400*a* may be performed by one or more components of wireless communication device 102, wireless communication device 104, wireless communication device 106, or wireless communication device 108. Embodiments are not limited in this context.

With reference to FIG. 4A, process flow 400*a* illustrates example functions used by various embodiments. Although specific function blocks ("blocks") are disclosed in process flow 400*a*, such blocks are examples. That is, embodiments are well suited to performing various other blocks or variations of the blocks recited in process flow 400*a*. It is appreciated that the blocks in process flow 400*a* may be performed in an order different than presented, and that not all of the blocks in process flow 400*a* may be performed.

Process flow 400*a* begins at block 402, where the processing logic determines the rate of the rate control algorithm. At block 408 the WLAN RSSI, R1, may be determined. Proceeding to block 404, the optimal WLAN transmission power, P1, may be determined based on the rate and the WLAN RSSI, R1. Continuing to block 406, the RF interference power, I1, seen at the WPAN radio for the optimal WLAN transmission power may be determined by $$WLAN_{I1} = P1 - I,$$

where I is the isolation between the WLAN and WPAN antennas.

Figure 4B:
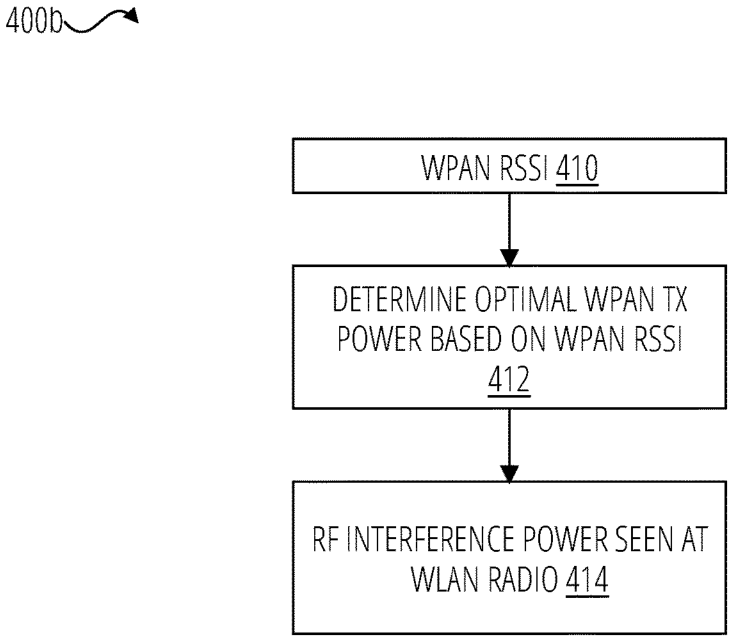
FIG. 4B illustrates an exemplary process flow for determining RF interference power seen at a WPAN radio according to some embodiments.

FIG. 4B illustrates a process flow 400*b* for determining RF interference power seen at a WLAN radio according to some embodiments. The process flow 400*b* may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of process flow 400*a* may be performed by one or more components of wireless communication device 102 or wireless communication device 106. Embodiments are not limited in this context.

With reference to FIG. 4B, process flow 400*b* illustrates example functions used by various embodiments. Although specific function blocks ("blocks") are disclosed in process flow 400*b*, such blocks are examples. That is, embodiments are well suited to performing various other blocks or variations of the blocks recited in process flow 400*b*. It is appreciated that the blocks in process flow 400*b* may be performed in an order different than presented, and that not all of the blocks in process flow 400*b* may be performed.

Process flow 400*b* begins at block 410, where the processing logic determines the WPAN RSSI, R2. At block 412 the optimal WPAN transmission power, P2, may be determined based on the WPAN RSSI, R2. Continuing to block 414, the RF interference power, I2, seen at the WLAN radio for the optimal WPAN transmission power may be determined by $$WPAN_{I2} = P2 - I,$$

where I is the isolation between the WLAN and WPAN antennas.

In many embodiments, two metrics may be determined based on the process flows 400*a*, 400*b*. A first metric, M1, may be calculated by $$M1 = I1 - R2,$$

and a second metric, M2, may be calculated by $$M2 = I2 - R1.$$

A first mapping table may then be utilized to map M1 to a minimum separation, S1, between WLAN and WPAN channels needed from the WPAN radio. A second mapping table may then be utilized to map M2 to a minimum separation, S2, between WLAN and WPAN channels needed from the WLAN radio. Use of S1 and S2 will be described in more detail below with respect to FIG. 5.

Figure 5:
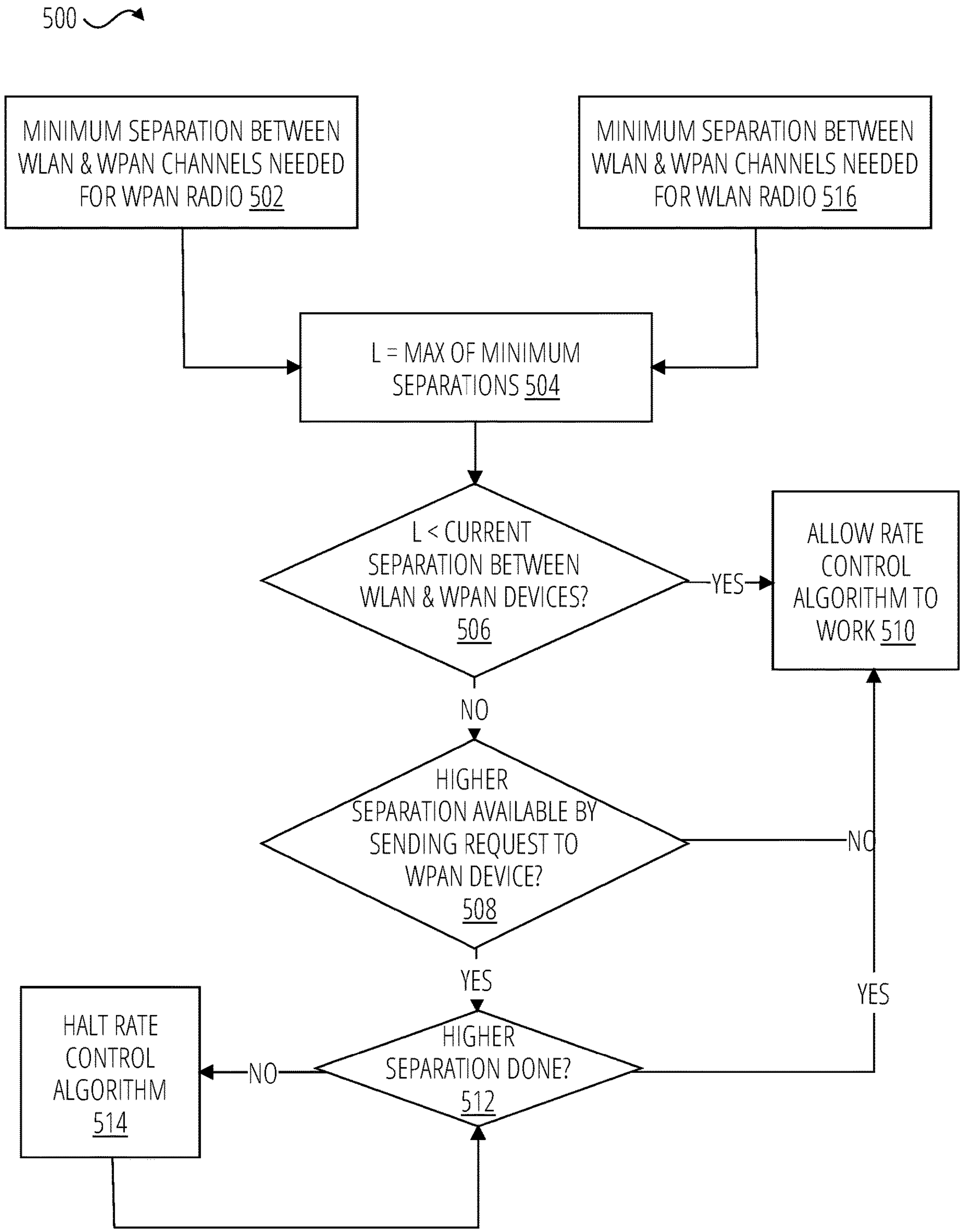
FIG. 5 illustrates an exemplary process flow for channel selection according to some embodiments.

FIG. 5 illustrates a process flow 500 for channel selection according to some embodiments. The process flow 500 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of process flow 500 may be performed by one or more components of wireless communication device 102 or wireless communication device 106, such as in-band isolation analyzer 112 and/or processing device 110. Embodiments are not limited in this context.

With reference to FIG. 5, process flow 500 illustrates example functions used by various embodiments. Although specific function blocks ("blocks") are disclosed in process flow 500, such blocks are examples. That is, embodiments are well suited to performing various other blocks or variations of the blocks recited in process flow 500. It is appreciated that the blocks in process flow 500 may be performed in an order different than presented, and that not all of the blocks in process flow 500 may be performed.

Process flow 500 begins at block 502, where the processing logic determines the minimum separation, S1, between WLAN and WPAN channels needed for the WPAN radio. At block 516 the minimum separation, S2, between WLAN and WPAN channels needed for the WLAN radio is determined. Determination of S1 and S2 is described above in the description of FIG. 4B. The max of S1 and S2, referred to as L, is determined at block 504.

The process flow 500 may then proceed to decision block 506 where it is determined if L is less than a current separation between WLAN and WPAN devices. If L is less than the current separation between WLAN and WPAN devices, the process flow 500 may proceed to block 510 where the rate control algorithm is allowed to work. In various embodiments, operation of the rate control algorithm may select the MCS. If L is not less than the current separation between WLAN and WPAN devices, the process flow 500 may proceed to decision block 508. At decision block 508 it may be determined whether higher separation would available by sending a request to a WPAN device. If higher separation is not available, the process flow 500 may proceed to block 510 where the rate control algorithm is allowed to work.

If higher separation is available, the process flow 500 may proceed to decision block 512 where it is determined if the higher separation is implemented. If the higher separation is not done, the process flow 500 may proceed to block 514 where the rate control algorithm is halted and then the process flow 500 may return to decision block 512. If the higher separation is done, the process flow 500 may proceed to block 510 where the rate control algorithm is allowed to work.

Figure 6:
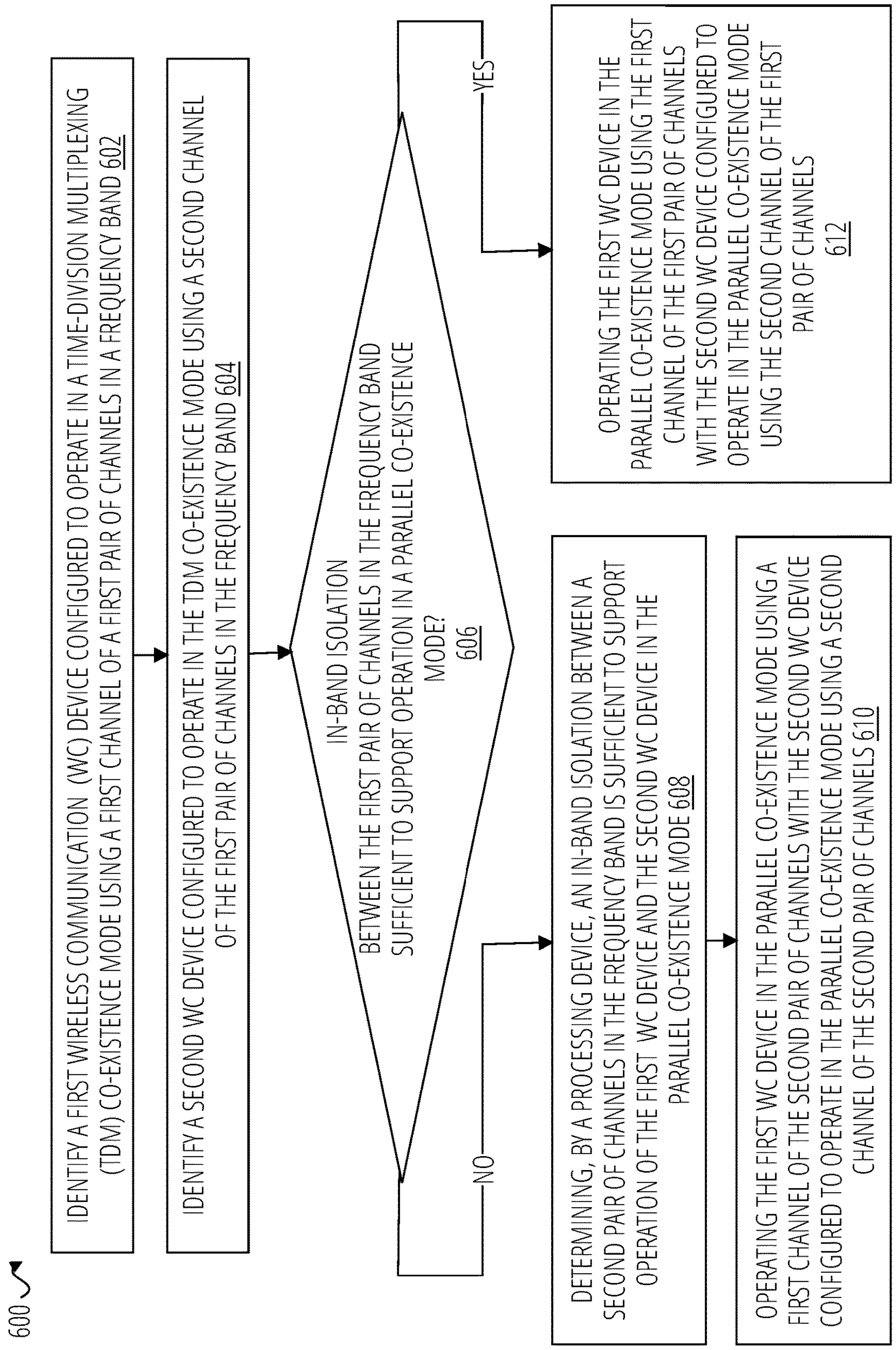
FIG. 6 illustrates an exemplary logic flow for increasing in-band isolation between wireless communication devices according to some embodiments.

FIG. 6 illustrates a logic flow 600 for increasing in-band isolation between wireless communication devices according to some embodiments. The logic flow 600 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of logic flow 600 may be performed by one or more components of wireless communication device 102 or wireless communication device 106. Embodiments are not limited in this context.

With reference to FIG. 6, logic flow 600 illustrates example functions used by various embodiments. Although specific function blocks ("blocks") are disclosed in logic flow 600, such blocks are examples. That is, embodiments are well suited to performing various other blocks or variations of the blocks recited in logic flow 600. It is appreciated that the blocks in logic flow 600 may be performed in an order different than presented, and that not all of the blocks in logic flow 600 may be performed.

Logic flow 600 begins at block 602, where the processing logic may identify a first wireless communication device configured to operate in a TDM co-existence mode using a first channel of a first pair of channels in a frequency band. For example, processing device 110 may identify wireless communication device 102 as configured to operate in a TDM co-existence mode using channel 5 of WLAN channels 204 in a 2.4 GHz frequency band. In some such examples, the wireless communication device 102 may include a WLAN device. Proceeding to block 604, a second wireless communication device configured to operate in the TDM co-existence mode using a second channel of the first pair of channels in the frequency band may be identified. For example, in-band isolation analyzer 112 may identify wireless communication device 104 as configured to operate in a TDM co-existence mode using channel 20 of WPAN channels 202 in a 2.4 GHz frequency band. In some such examples, the wireless communication device 104 may include a WPAN device.

Continuing to decision block 606, it may be determined whether the in-band isolation between the first pair of channels in the frequency band is sufficient to support operation in a parallel co-existence mode. In some embodiments, the parallel co-existence mode may include a hybrid co-existence mode. If there is sufficient in-band isolation between the first pair of channels in the frequency band to support operation in a parallel co-existence mode, the logic flow 600 may proceed to block 612. At block 612 the first wireless communication device may be operated in the parallel co-existence mode using the first channel of the first pair of channels and the second wireless communication device may be operated in the parallel co-existence mode using the second channel of the first pair of channels. For example, wireless communication device 102 may be operated in the parallel co-existence mode using channel 5 of WLAN channels 204 in the 2.4 GHz frequency band and wireless communication device 104 may be operated in the parallel co-existence mode using channel 20 of the WPAN channels 202.

If there is not sufficient in-band isolation between the first pair of channels to support operation in a parallel co-existence mode, the logic flow 600 may proceed to block 608. At block 608 a processing device may determine an in-band isolation between a second pair of channels in the frequency band is sufficient to support operation of the first and second wireless communication devices in the parallel co-existence mode. For example, processing device 110 may determine an in-band isolation between channel 2 of WLAN channels 204 and channel 25 of WPAN channels 202 is sufficient to support operation of wireless communication device 102 and wireless communication device 104. Proceeding to block 610, the first wireless communication device may be operated in the parallel co-existence mode using a first channel of the second pair of channels with the second wireless communication device configured to operate in the parallel co-existence mode using a second channel of the second pair of channels. For example, wireless communication device 102 may be operated in the parallel co-existence mode using channel 2 of WLAN channels 204 with wireless communication device 104 configured to operate in the parallel co-existence mode using channel 25 of WPAN channels 202.

In some embodiments, the second wireless communication device may be signaled to operate in the parallel co-existence mode using the second channel of the second pair of channels in the frequency band. In various embodiments, the first channel of the first pair of channels is the first channel of the second pair of channels and the second channel of the first pair of channels is different than the second channel of the second pair of channels. In other words, only the second wireless communication device (e.g., a WPAN device) switches channels. Accordingly, in various such embodiments, the in-band isolation between the second pair of channels is determined to be sufficient to support operation of the first and second wireless communication devices in the parallel co-existence mode in response to determining the second wireless communication device is not a client or end device. In some embodiments, determining the in-band isolation between the second pair of channels in the frequency band is sufficient to support operation of the first and second wireless communication devices in the parallel co-existence mode may include identifying a set of one or more channels in the frequency band that the second wireless communication device is able to utilize, the set of one or more channels including the second channel in the second pair of channels, determining the second channel in the second pair of channels has a maximum in-band isolation with the first channel in the second pair of channels in view of the set of one or more channels the second wireless communication device is able to utilize, and selecting the second channel in the second pair of channels in the frequency band based on determining the second channel in the second pair of channels has the maximum in-band isolation with the first channel in the second pair of channels.

In several embodiments, the first channel of the first pair of channels in the frequency band is different than the first channel of the second pair of channels in the frequency band and the second channel of the first pair of channels in the frequency band is the second channel in the second pair of channels in the frequency band. In other words, only the first wireless communication device (e.g., a WLAN device) switches channels. Accordingly, in several such embodiments, the in-band isolation between the second pair of channels in the frequency band is determined to be sufficient to support operation of the first and second wireless communication devices in the parallel co-existence mode in response to determining at least one of the first wireless communication device includes a software enabled access point or the second wireless communication device includes a client or end device.

In many embodiments, the first channel of the first pair of channels in the frequency band is different than the first channel of the second pair of channels in the frequency band and the second channel of the first pair of channels in the frequency band is different than the second channel of the second pair of channels in the frequency band. In other words, the first and second wireless communication devices switch channels. Accordingly, in many such embodiments, the in-band isolation between the second pair of channels in the frequency band is determined to be sufficient to support operation of the first and second wireless communication devices in the parallel co-existence mode in response to determining the first wireless communication device includes a software enabled access point and the second wireless communication device is not a client or end device. In a further embodiment, the in-band isolation between the second pair of channels in the frequency band is determined to be sufficient to support operation of the first and second wireless communication devices in the parallel co-existence mode in response to determining an in-band isolation between the first channel of the first pair of channels and the second channel of the second pair of channels is not sufficient to support operation of the first and second wireless communication devices in the parallel co-existence mode.

Various embodiments may include determining the in-band isolation between the second pair of channels in the frequency band is sufficient to support operation of the first and second wireless communication devices in the parallel co-existence mode based on a received signal strength indicator (RSSI) of the first wireless communication device, an isolation, I, between a first antenna of the first wireless communication device and a second antenna of the second wireless communication device, and a transmit power, P2, of the second wireless communication device. For example, determining the in-band isolation is sufficient may include, determining an intermediate value by subtracting the ISO and the RSSI from the T2, mapping the intermediate value to a first index value based on a first table, mapping the RSSI to a second index value based on a second table, and determining the first index value is greater than the second index value.

In one or more embodiments, the first wireless communication device may operate according to a first wireless communication standard and the second wireless communication device operates according to a second wireless communication standard that is different than the first wireless communication standard. In one or more such embodiments, the first wireless communication standard may define operation of a wireless personal area network and the second wireless communication standard defines operation of a wireless local area network. In some embodiments, the frequency band may be between 2.4 and 2.5 GHZ.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those using physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Reference in the description to "an embodiment," "one embodiment," "an example embodiment," "some embodiments," "various embodiments", and the like means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," "various embodiments", and the like in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "operating," "identifying", "determining," "operating," "sending," "receiving," "generating," "switching," or the like, refer to the actions and processes of a processing device, an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes at least one of A or B" or "X includes A or B" is intended to mean any of the natural inclusive permutations. That is, if X includes A; X includes B; or X includes both A and B, then "X includes at least one of A or B" or "X includes A or B" is satisfied under any of the foregoing instances. Similarly, "X includes one or more of A and B" should be interpreted the same as "X includes at least one of A or B". In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus (e.g., such as a wireless communication device including at least one of an end device, a client device, a station (STA), an access point, a router, or a coordinator) for performing the operations herein. This apparatus may be specially constructed for the specific purposes, or it may include firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments. Further, a "computer-readable medium" or "computer-readable storage medium" may be non-transitory.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:

identifying a first wireless communication (WC) device configured to operate in a time-division multiplexing (TDM) co-existence mode using a first channel of a first pair of channels in a frequency band;

identifying a second WC device configured to operate in the TDM co-existence mode using a second channel of the first pair of channels in the frequency band;

determining an in-band isolation between the first pair of channels in the frequency band is insufficient to support an operation of the first WC device and the second WC device in a parallel co-existence mode;

determining, by a processing device, that an in-band isolation between a second pair of channels in the frequency band is sufficient to support an operation of the first WC device and the second WC device in the parallel co-existence mode; and operating the first WC device in the parallel co-existence mode using a first channel of the second pair of channels with the second WC device configured to operate in the parallel co-existence mode using a second channel of the second pair of channels.

2. The method of claim 1, further comprising signaling the second WC device to operate in the parallel co-existence mode using the second channel of the second pair of channels in the frequency band.

3. The method of claim 1, wherein the first channel of the first pair of channels is the first channel of the second pair of channels and the second channel of the first pair of channels is different than the second channel of the second pair of channels.

4. The method of claim 3, wherein the in-band isolation between the first channel of the first pair of channels and the second channel of the first pair of channels is determined to be sufficient to support operation of the first and second WC devices in the parallel co-existence mode in response to determining the second WC device is not a client or end device.

5. The method of claim 3, wherein determining the in-band isolation between the first channel of the first pair of channels and the second channel of the first pair of channels is sufficient to support operation of the first and second WC devices in the parallel co-existence mode includes:

identifying a set of one or more channels in the frequency band that the second WC device is able to utilize, the set of one or more channels including the second channel in the second pair of channels;

determining the second channel in the second pair of channels has a maximum in-band isolation with the first channel in the second pair of channels in view of the set of one or more channels the second WC device is able to utilize; and selecting the second channel in the second pair of channels in the frequency band based on determining the second channel in the second pair of channels has the maximum in-band isolation with the first channel in the second pair of channels.

6. The method of claim 1, wherein the first channel of the first pair of channels in the frequency band is different than the first channel of the second pair of channels in the frequency band and the second channel of the first pair of channels in the frequency band is the second channel of the second pair of channels in the frequency band.

7. The method of claim 6, wherein the in-band isolation between the first channel of the second pair of channels and the second channel of the second pair of channels is determined to be sufficient to support operation of the first and second WC devices in the parallel co-existence mode in response to determining at least one of the first WC device includes a software enabled access point or the second WC device includes a client or end device.

8. The method of claim 6, further comprising switching the first WC device from the first channel of the first pair of channels to the first channel of the second pair of channels.

9. The method of claim 1, wherein the first channel of the first pair of channels in the frequency band is different than the first channel of the second pair of channels in the frequency band and the second channel of the first pair of channels in the frequency band is different than the second channel of the second pair of channels in the frequency band.

10. The method of claim 9, wherein the in-band isolation between the first channel of the second pair of channels and the second channel of the second pair of channels is determined to be sufficient to support operation of the first and second WC devices in the parallel co-existence mode in response to determining the first WC device includes a software enabled access point and the second WC device is not a client or end device.

11. The method of claim 10, wherein the in-band isolation between the first channel of the second pair of channels and the second channel of the second pair of channels is determined to be sufficient to support operation of the first and second WC devices in the parallel co-existence mode in response to determining an in-band isolation between the first channel of the first pair of channels and the second channel of the second pair of channels is not sufficient to support operation of the first and second WC devices in the parallel co-existence mode.

12. The method of claim 1, further comprising determining the in-band isolation between the first channel of the second pair of channels and the second channel of the second pair of channels in the frequency band is sufficient to support operation of the first and second WC devices in the parallel co-existence mode based on a received signal strength indicator (RSSI) of the first WC device, an isolation (I) between a first antenna of the first WC and a second antenna of the second WC device, and a transmit power (P2) of the second WC device.

13. The method of claim 12, wherein determining the in-band isolation is sufficient includes:
- determining an intermediate value by subtracting the I and the RSSI from the P2;
- mapping the intermediate value to a first index value based on a first table;
- mapping the RSSI to a second index value based on a second table; and
- determining the first index value is greater than the second index value.

14. The method of claim 1, wherein the first WC device operates according to a first wireless communication standard and the second WC device operates according to a second wireless communication standard that is different than the first wireless communication standard.

15. The method of claim 14, wherein the first wireless communication standard defines operation of a wireless personal area network and the second wireless communication standard defines operation of a wireless local area network.

16. The method of claim 1, wherein the frequency band is between 2.4 and 2.5 gigahertz.

17. A wireless communication device comprising:
- a radio; and
- a processing device coupled to the radio, the one or more processors configured to:
  - identify a first wireless communication (WC) device configured to operate in a time-division multiplexing (TDM) co-existence mode using a first channel of a first pair of channels in a frequency band;
  - identify a second WC device configured to operate in the TDM co-existence mode using a second channel of the first pair of channels in the frequency band;
  - determine an in-band isolation between the first pair of channels in the frequency band is insufficient to support an operation of the first WC device and the second WC device in a parallel co-existence mode;
  - determine an in-band isolation between a second pair of channels in the frequency band is sufficient to support an operation of the first WC device and the second WC device in the parallel co-existence mode; and
  - operate the first WC device in the parallel co-existence mode using a first channel of the second pair of channels with the second WC device configured to operate in the parallel co-existence mode using a second channel of the second pair of channels.

18. The wireless communication device of claim 17, wherein the one or more processors further configured to signal the second WC device to operate in the parallel co-existence mode using the second channel of the second pair of channels in the frequency band.

19. The wireless communication device of claim 17, wherein the first channel of the first pair of channels is the first channel of the second pair of channels and the second channel of the first pair of channels is different than the second channel of the second pair of channels.

20. A system on chip (SOC) device comprising:
- a radio; and
- a processing device operatively coupled to the radio, wherein the processor is configured to:
  - identify a first wireless communication (WC) device configured to operate in a time-division multiplexing (TDM) co-existence mode using a first channel of a first pair of channels in a frequency band;
  - identify a second WC device configured to operate in the TDM co-existence mode using a second channel of the first pair of channels in the frequency band;
  - determine an in-band isolation between the first pair of channels in the frequency band is insufficient to support an operation of the first WC device and the second WC device in a parallel co-existence mode;
  - determine an in-band isolation between a second pair of channels in the frequency band is sufficient to support an operation of the first WC device and the second WC device in the parallel co-existence mode; and
  - operate the first WC device in the parallel co-existence mode using a first channel of the second pair of channels with the second WC device configured to operate in the parallel co-existence mode using a second channel of the second pair of channels.

* * * * *